United States Patent [19]

Fisk et al.

[11] Patent Number: 5,079,816

[45] Date of Patent: Jan. 14, 1992

[54] POSITIVE SEAL COUPLING INTERNAL JOINING PRESS

[75] Inventors: Allan T. Fisk, Needham; David I. Freed, Weston, both of Mass.

[73] Assignee: Electric Power Research Institute, Inc., Palo Alto, Calif.

[21] Appl. No.: 566,022

[22] Filed: Sep. 20, 1990

[51] Int. Cl.⁵ .............................................. B23P 19/04
[52] U.S. Cl. ....................................... 29/237; 29/244; 29/252; 29/282
[58] Field of Search .................. 29/237, 244, 252, 282

[56] References Cited

U.S. PATENT DOCUMENTS

| | | | |
|---|---|---|---|
| 3,061,916 | 11/1962 | Kretz | 29/252 |
| 3,233,315 | 2/1966 | Levake | 29/252 |
| 3,259,964 | 7/1966 | Engel | 29/252 |
| 3,469,298 | 9/1969 | Pizzagalli | 29/237 |
| 3,486,214 | 12/1969 | Curtis et al. | 29/237 |
| 3,639,967 | 2/1972 | Brighton | 29/237 |
| 3,644,977 | 2/1972 | Valentine | 29/244 |
| 3,699,635 | 10/1972 | Bradley et al. | 29/252 |
| 3,787,951 | 1/1974 | Morphis et al. | 29/237 |
| 3,831,256 | 8/1974 | Bjalme et al. | 29/237 |
| 4,097,982 | 7/1978 | Pentreath et al. | 29/237 |
| 4,328,608 | 5/1982 | Gibson | 29/237 |
| 4,328,983 | 5/1982 | Gibson | 285/382 |
| 4,329,124 | 5/1982 | Pridy | 417/545 |
| 4,389,763 | 6/1983 | Marsh, Jr. | 29/237 |

OTHER PUBLICATIONS

Type GP Otis Gravel Pack Packer Specification, 12GP.5, p. 72.
Bowen Full Circle Releasing Spears Instruction Manual, No. 5/2100, pp. 1–5.
Bowen Releasing Spears Specification, 3 pages.
TIW HB Series Retrievables Specification, p. 50.
Brown Type HMC Liner Hanger Specification, p. 6.
Brown Type HRS Hydraulic Set Rotating Shorty Liner, Hanger Specification, p. 7.
Lindsey Set Liner Hangers Specification, 1987, p. 12.

Primary Examiner—P. W. Echols
Assistant Examiner—David P. Bryant
Attorney, Agent, or Firm—Laurence Coit

[57] ABSTRACT

This invention is a new device for installing press fit couplings to join steel pipelines. This apparatus is a joining press which fits inside the pipes to be joined and grabs them on their inside surfaces. It then pulls the pipes together, forcing the pipe ends into the coupling. The invention is comprised of two hydraulically operated grippers to grip the pipe and a hydraulically operated cylinder to pull the pipes together. The entire press is controlled using only two hydraulic lines. The grippers can be retracted and the apparatus moved within the pipeline from one joint to the next.

13 Claims, 8 Drawing Sheets

POSITIVE SEAL COUPLING INTERNAL JOINING PRESS

BACKGROUND OF THE INVENTION

1. Field of the Invention

This invention relates to couplings used to join sections of pipe together into a continuous pipeline.

2. Description of Related Art

The conventional way to assemble pipelines is to weld individual pieces of pipe together For large diameter pipes, however, welding is a slow process. One way to avoid the high cost of welding is to use a sleeve-type coupling to fit over the two ends of the two pipes being joined.

Several sleeve-type couplings have been developed. Representative is U.S. Pat. No. 4,328,983 issued to Jack E. Gibson. The coupling consists of a sleeve having an internal diameter slightly smaller than the external diameter of the pipe sections to be joined. Forcing one end of a pipe section into each end of the coupling sleeve effects a press fit, sealed connection between each pipe section and the coupling.

Installation of couplings on pipe sections can be accomplished with a machine disclosed in U.S. Pat. No. 4,328,608 also issued to Jack E. Gibson. This machine grabs the outside of the pipe, grabs the end of the coupling, then forces the pipe into the inside of the coupling using two hydraulic cylinders which generate a force of approximately 120,000 lbs. Once the coupling is installed onto one end of a pipe, a second pipe can be installed, completing the joint. A major problem with this machine is that the hydraulic rams used to exert the forces necessary to accomplish the press fit must be mounted on a massive base which, in turn, can withstand the forces without becoming deformed. Consequently, this machine can only be used where there is ample, unobstructed space for its operation. Often it is used to construct underground oil transmission pipelines. The pipeline is assembled on the surface and then lowered into a trench. There normally is plenty of space around the trench, so the large size of the installation equipment is not a problem.

There are many instances where space is limited and the standard joining press cannot be used. One example is pipe containing high voltage electric transmission cables in an urban environment. Urban pipe-type installations are typically encumbered by frequent crossings of other utilities and by trench shoring, both of which prevent the lowering of a surface joined pipeline directly into the trench. Cramped quarters and the need to minimize trench size also prohibit placing the existing press into the trench for making the joint.

One solution to this problem is disclosed in U.S. Pat. No. 4,389,763 issued to Richard O. Marsh, Jr. The device used by Marsh has a slotted end plate which abuts the end of the pipe section opposite that to be inserted in the coupling. A hollow piston rod is attached to the end plate via a hydraulic cylinder and extends inside the pipe for the entire length of the pipe section. The hollow piston rod ends with a multi-fingered pawl mechanism which is used to grip a coupling previously installed on the other section of pipe. The coupling used with this device is a cylinder with annular grooves machined or cast in the ends of the cylinder. The ends of the pipe sections are press fit into the grooves on either end of the cylindrical sleeve. When the coupling is installed on one end of a pipe section, the resulting profile of the internal wall of the pipe-coupling combination contains an abrupt step formed by the end of the coupling sleeve. The pawl mechanism grips this step and the hydraulic cylinder puts the hollow piston rod in tension, thus drawing the end of the pipe section into the annular groove of the coupling.

Although this device reduces the size of the installation machinery, it has a number of significant drawbacks. The device is still quite large and unwieldy because the piston rod must be as long as the section of pipe being installed. The device cannot be used on pre-bent pipe because of the straight piston rod. Even if a flexible cable were substituted for the rigid piston rod, the device could not be used with bent pipe because the force is applied to the ends of the pipe and the eccentricity of the bent pipe would cause it to fold. And finally, the completed pipeline contains numerous steps along its interior which significantly increase pressure drop when the pipe is used to transport fluid or which significantly increase the chance of installation damage to insulation when the pipe contains electrical conductors.

It is an object of the invention to provide a small, compact pipe coupling apparatus which can be used in the confined spaces of a pipe trench.

Another object of the invention is to provide a pipe coupling apparatus which can be used to join pre-bent sections of pipe.

It is yet another object of the invention to provide a pipe coupling apparatus that results in a pipe joint without abrupt steps in the interior surface of the pipeline.

These and other objects are accomplished by the subject invention.

SUMMARY OF THE INVENTION

This invention is a new device for installing sleeve type couplings to join steel pipelines. The invention comprises a joining press which fits inside the pipes to be joined and grabs them on their inside surfaces. It then pulls the pipes together, forcing the ends of each pipe into the coupling. The invention is comprised of two hydraulically operated grippers to grip the pipe and a hydraulically operated cylinder to pull the pipes together. The entire press is controlled using only two hydraulic lines.

BRIEF DESCRIPTION OF THE DRAWINGS

FIG. 1 shows the operational procedure used in joining pipe with the invention and the relationship between the various parts of the invention.

DESCRIPTION OF THE PREFERRED EMBODIMENT

Figure 1A:
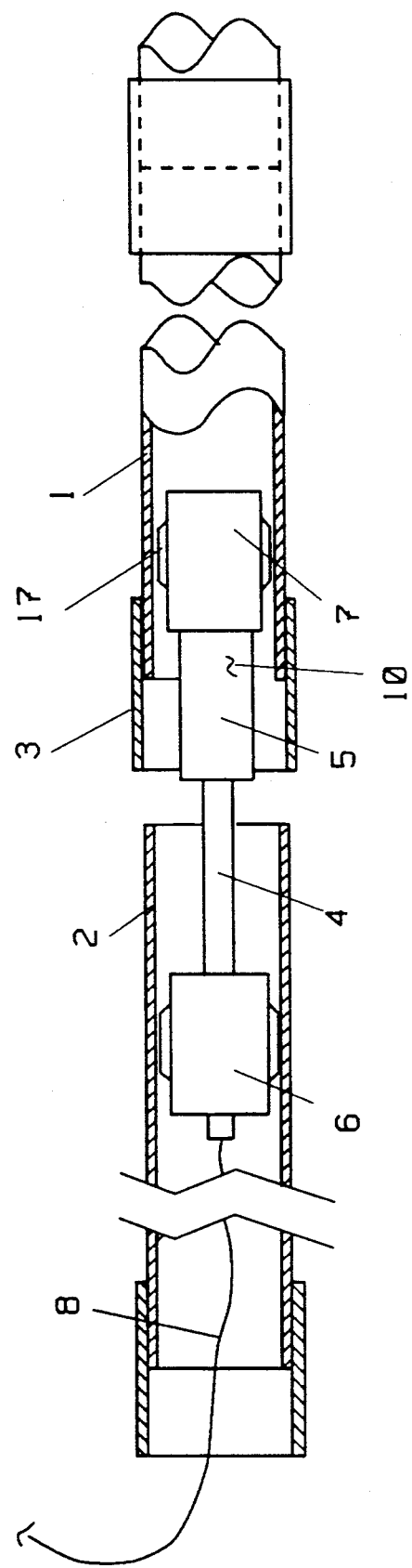
FIG. 1a shows the press in position to make a joint.

Referring now to FIG. 1a, the invention, generally indicated as 10 is shown ready to join first pipe 1 to second pipe 2 with coupling 3. The main cylinder 5 is positioned approximately inside the coupling 3 with its piston rod 4 in the fully extended position. The inboard gripper 7 and outboard gripper 6 are in the retracted position. The second pipe 2 is positioned close to the coupling 3. The hydraulic hose assembly, generally referred to as 8 is snaked through the second pipe 2 and connected to the hydraulic power supply and valve package (not shown).

Figure 1B:
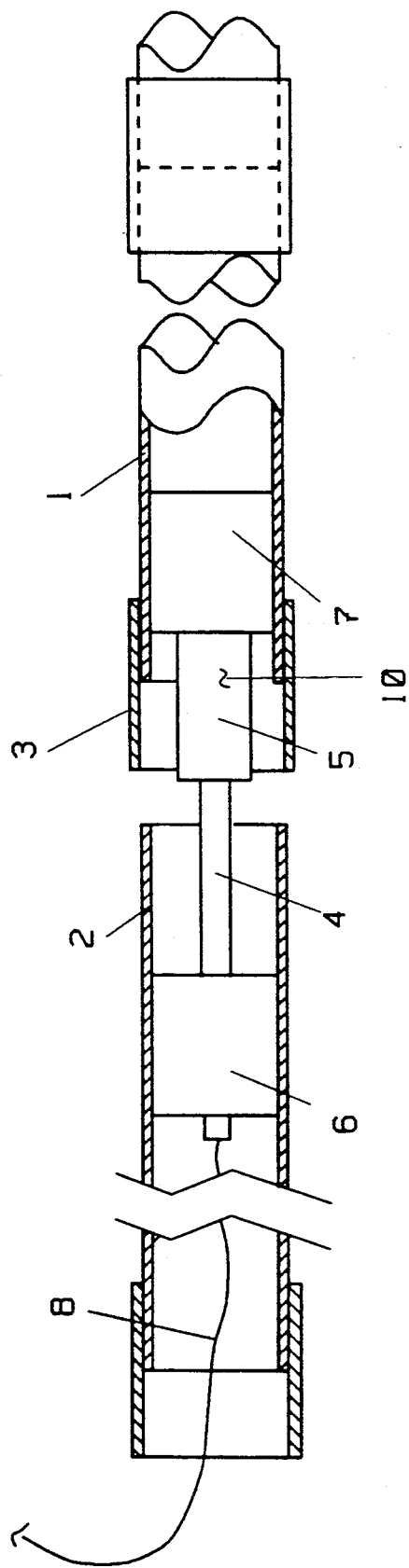
FIG. 1b shows the press gripping the two pipes to be joined.

Referring now to FIG. 1b, after the press 10 and pipes 1,2 are positioned, the inboard gripper 7 and outboard gripper 6 are hydraulically actuated. The inboard gripper 7 grips the first pipe 1 and the outboard gripper 6 grips the second pipe 2. The main cylinder 5 is then retracted so the piston rod 4 is drawn inside. This pulls the two pipes 1,2 together inside the coupling 3. When the two pipes 1,2 touch each other the joining process is complete, and the completed joint is shown in FIG. 1c.

Figure 1C:
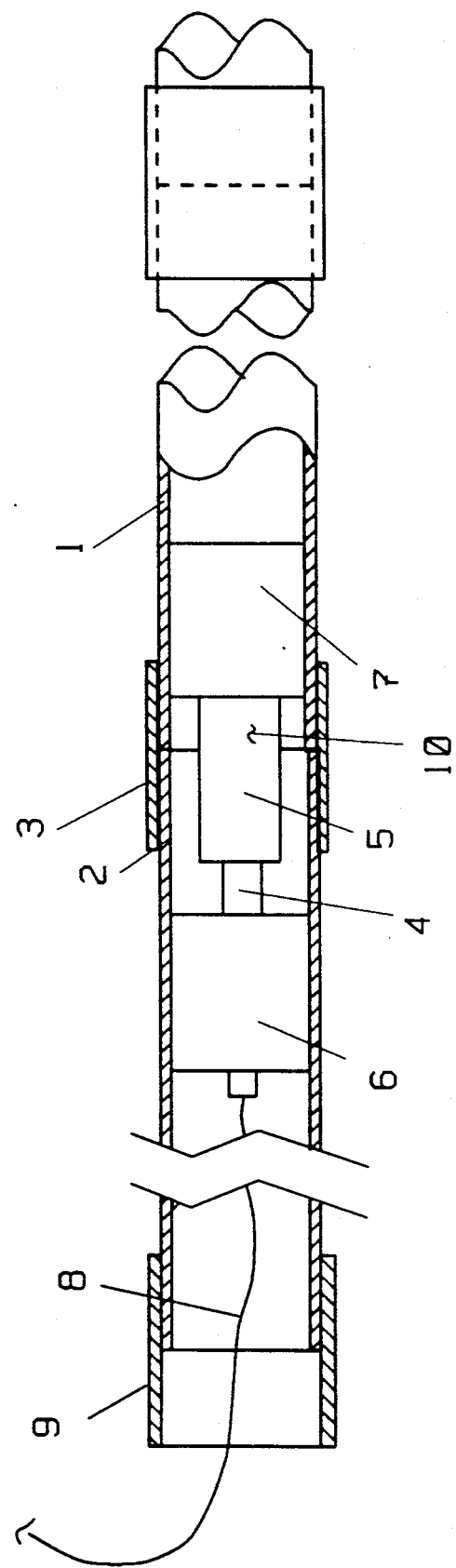
FIG. 1c shows the press with the main cylinder retracted and the joint completed.

Reference is now made to FIG. 1c, which shows a completed joint. The two grippers 6,7 are then retracted. The press 10 is then slid to the left by a tension member or rope in the hydraulic hose assembly 8 and partway out of the pipe 2 to get ready to make the next joint using coupling 9. Once the grippers 6,7 are retracted, the press rests on plastic skid pads 17 as shown in FIG. 1a. The skid pads 17 are made of a low-friction material and protect the pipe 2 from damage that would be caused if the gripping teeth of the grippers 6,7 contacted the pipe 2 as it slid down it. When the grippers 6,7 are engaged, they extend outward beyond the skid pads 17 and grip the pipe.

Indicated above is merely one of many possible permutations for constructing a pipeline. Other possible permutations include assemblinq pipes from left to right instead of from right to left, and having the coupling 3 on the second pipe 2 instead of on the first pipe 1. All permutations can just as easily be handled with this invention.

It should be further noted that in the sequence shown in FIG. 1a–c, the coupling 3 is depicted as having been previously attached to the first pipe section 1, prior to completing the pipeline joint. Prejoining of coupling 3 to pipe section 1 could have been done by a variety of means, including means employing this invention (as described below and in FIG. 2). Alternative means of preattachment of coupling 3 to pipe section 1 could include, but need not be limited to welding, threaded engagement, or integral construction as in the so-called "bell and spigot" or male-female pipe geometry well known to pipeline practitioners.

Alternatively, it is possible with the subject invention to join coupling 3 to pipe sections 1 and 2 simultaneously, in which case the stroke of main cylinder 5 would need to be at least approximately twice as great as in the configuration depicted in FIGS. 1a–c.

Figure 2:
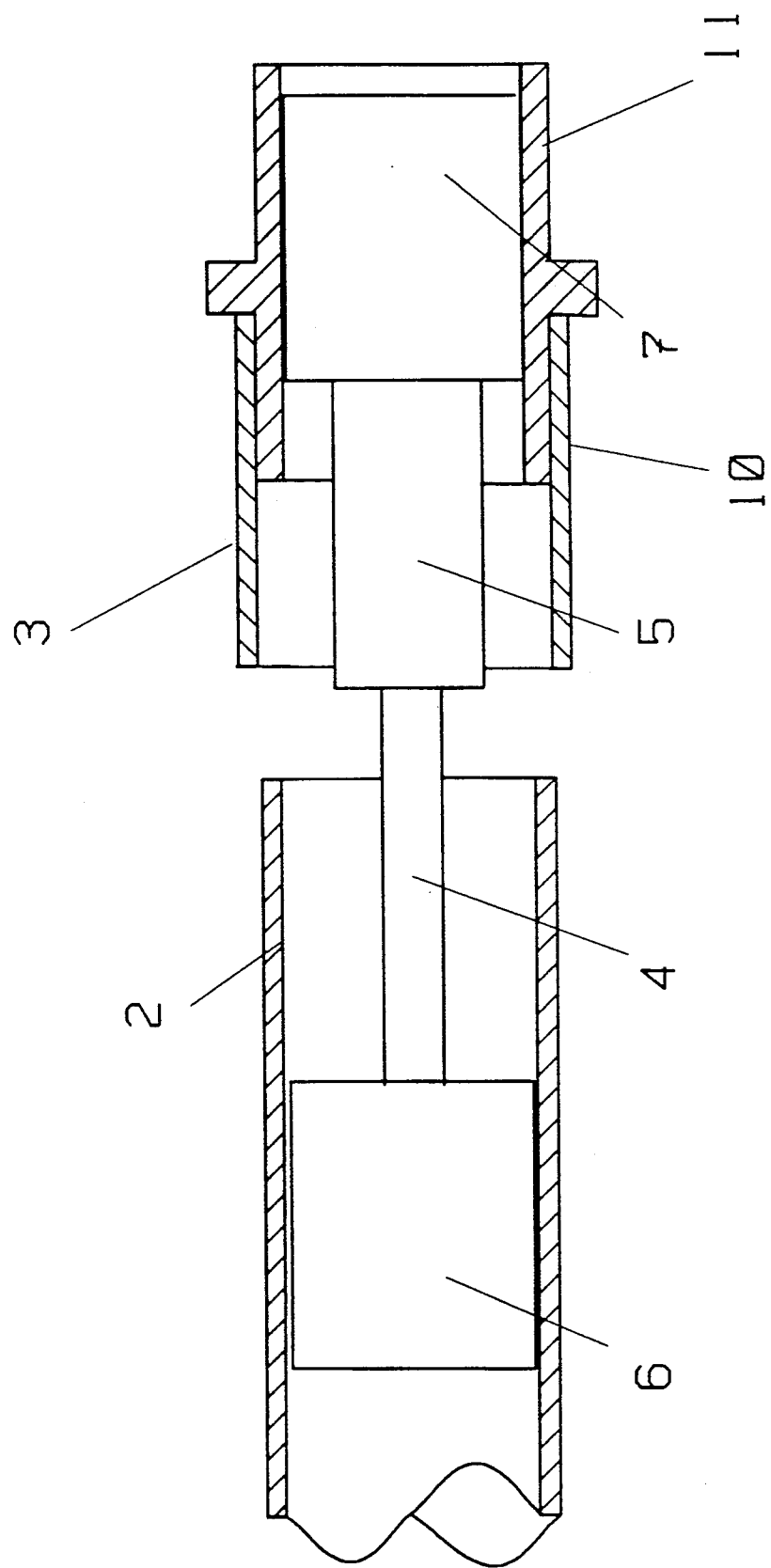
FIG. 2 is a view of the coupling adapter used in placing a coupling on a pipe.

Referring now to FIG. 2, a coupling adapter 11 is shown which can be used to place a coupling 12 on the end of a pipe 14 in situations where the coupling 12 has not been preinstalled. The coupling 12 is supported by the outside diameter of the adapter 11. The coupling 12 is pushed onto the pipe 14 by the shoulder section 15 of the adapter 11. The adapter 11 is in turn grabbed by the inboard gripper 7 which is pulled by the main cylinder 5. The coupling 12 is pushed onto the pipe 14 until the edge 16 of the adapter 11 contacts the end of the pipe 14. This assures that exactly half of the coupling 12 overlaps the pipe 14 and the other half of the coupling 12 is ready to accept the other pipe (not shown), forming the joint.

This situation is very similar to a normal procedure where two pipes are being joined, as can be seen by comparing FIGS. 2 and 1b. In FIG. 2, the adapter 11 takes the place of the first pipe 1 of FIG. 1b. Otherwise the procedure is the same.

Figure 3:
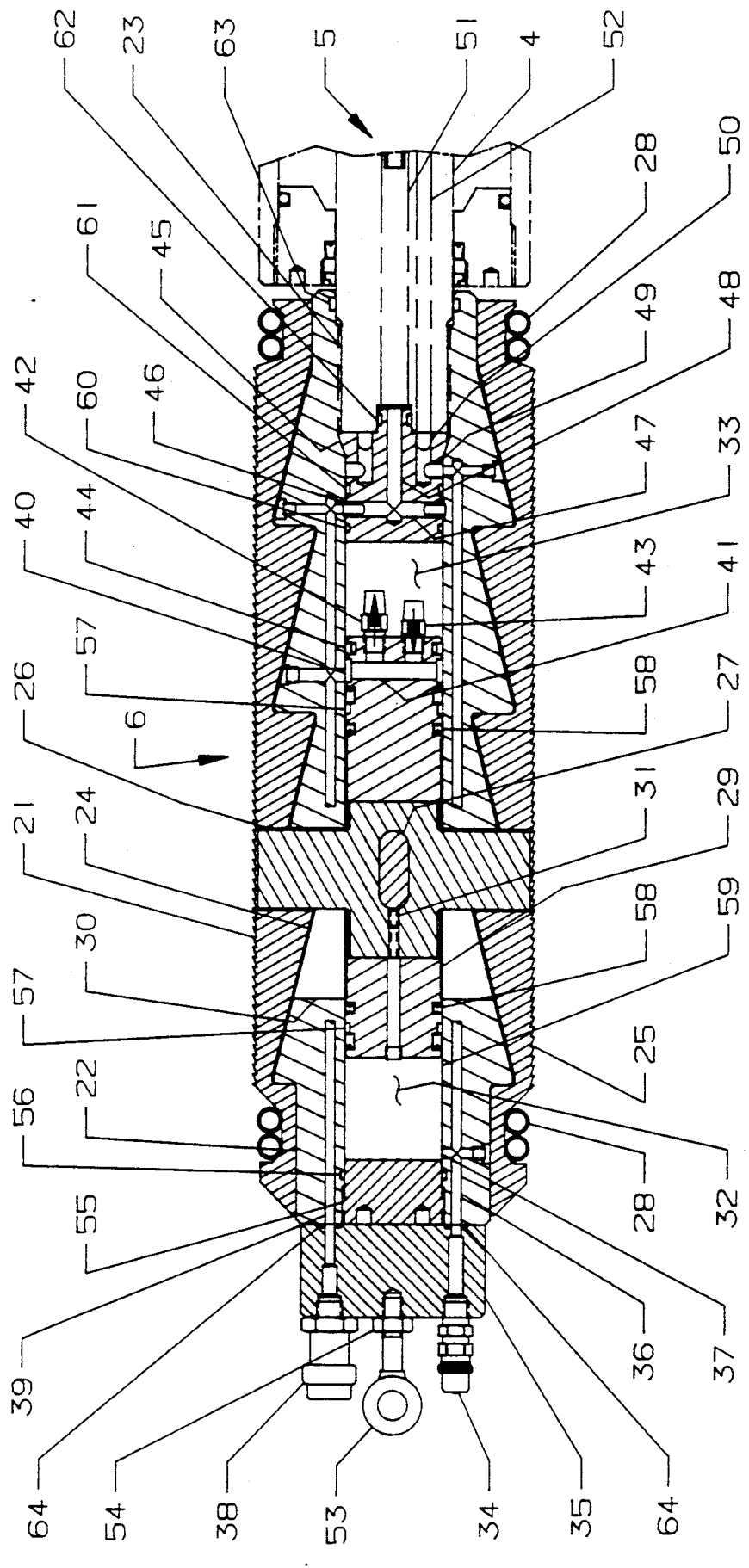
FIG. 3 is a cross sectional view of the outboard gripper of the present invention.

Turning now to FIG. 3, the mechanical details of the outboard gripper 6 are indicated. The parts of the gripper 6 which actually grip the inside of the pipe (not shown) are the slips 21. There are four slips 21, each forming an approximately 90 degree arc, surrounding a mandrel 22. The mandrel 22 is connected to the piston rod 4 of the main cylinder 5 via threads 23. Pulling force (in a horizontal direction to the right) is transferred from the piston rod 4, through the threads 23, to the mandrel 22. It is then transferred from the mandrel 22 to the slips 21 through four tapered cone sections 24 and finally from the slips 21 to the pipe (not shown) through a buttress thread 25 on the outside of the slips 21.

FIG. 3 shows the gripper 6 in the retracted (or released) position, in which its outside diameter is approximately 0.75 inches less than the inside diameter of the pipe being gripped. To grip the pipe, the slips 21 are pushed to the left by actuator bars 26 and 27. When the slips 21 are pushed to the left relative to the mandrel 22, the tapered cone sections 24 of the mandrel 22 push the slips radially outward until they contact and can grip the inside of the pipe (not shown). The angle of the tapered cones 24 is such that a force to the right from piston rod 4 tends to increase the contact force between the slips 21 and the pipe, enabling the slips 21 to grip the pipe harder.

To release the gripper 6, the slips 21 are pushed to the right. Four garter springs 28 then pull the slips 21 radially inward as the slips 21 maintain contact with the tapered cone sections 24. This reduces the outside diameter of the gripper 6 so that the slips 21 no longer contact the pipe and the gripper 6 (along with the entire joining press) may slide down the pipeline to make the next joint.

The actuator bars 26 and 27 reside partly inside a piston 29. The vertical bar 26 fits snugly inside a slot in the piston 29 and extends outward through slots 30 in the mandrel 22. The horizontal bar 27 also fits snugly inside a slot in the piston 29 and also fits snugly through a slot in the vertical bar 26. A set screw 31 holds the two actuator bars 26, 27 together and prevents relative motion between the two bars 26, 27 and the piston 29. The actuator or piston subassembly 26, 27, 29 is able however to slide horizontally relative to the mandrel 22 because the slots 30 are longer than the actuator bars 26, 27.

Motion of the piston 29 is controlled by the hydraulic fluid in two cavities 32, 33 on either side of it. If fluid enters the left cavity 32 and exits the right cavity 33, the piston will be pushed to the right and the gripper will retract. If fluid enters the right cavity 33 and exits the left cavity 32, the piston will be pushed to the left and the gripper will engage.

Hydraulic fluid enters and leaves the left cavity 32 via quick disconnect 34, manifold block 35, feed tube 36 and port 37. Hydraulic fluid enters and leaves the right cavity 33 via quick disconnect 38, manifold block 35, feed tube 39 and port 40. In the preferred embodiment of the invention, there are a multiplicity of ports 37, 40 and feed tubes 36, 39, increasing the flow area and decreasing the fluid flow velocity. Although not shown in the figure, in the preferred embodiment the manifold block 35 splits the flow from a single quick disconnect 34 into a multiplicity of feed tubes 36 and splits the flow from a single quick disconnect 38 into a multiplicity of feed tubes 39.

It is desirable to the operation of this invention to keep the gripper in the fully released position unless the hydraulic pressure of the fluid at quick disconnect 38 exceeds a certain threshold value (approximately 400 psi in the preferred embodiment). This is so the main cylinder may retract at a low pressure (less than 400 psi) without engaging the grippers as will be explained when discussing the hydraulic operation of the invention. This feature is accomplished by means of spring-loaded check valve 42 and check valve 43.

When the piston 29 is in the fully retracted position shown in FIG. 3, fluid from port 40 must flow through a drilled hole 41 in the piston 29 and through a spring-loaded check valve 42 before it may enter the right cavity 33 and move the piston. Thus the piston will not actuate the gripper until the pressure at port 40 exceeds the preset value of the spring-loaded check valve. Once the piston moves and the seal 44 moves past the port 40, fluid may enter cavity 33 directly, without flowing through drilled hole 41 and without the pressure drop caused by spring-loaded check valve 42. Fluid may always leave cavity 33 and enter port 40 without any restriction or pressure drop. When the piston in the position shown in FIG. 3, fluid leaves via check valve 43 and hole 41. When the seal 44 is to the left of port 40, fluid may enter port 40 directly.

Hydraulic fluid from quick disconnects 38, 34 is also used to control the main cylinder (5 in FIG. 1) and the outboard gripper (7 in FIG. 1). Fluid flows from quick disconnect 38, through the manifold 35 and mandrel 22 and then into a groove 46 in an internal manifold 45. From this groove 46 it enters a hole 47 and feed tube 48 and finally goes into the center hole of the main cylinder's 5 piston rod 4. Fluid from quick disconnect 34 flows through the manifold 35 and mandrel 22 and then into a groove 49 of internal manifold 45. From there it enters a face groove 50 and then goes into a feed hole 52 of the piston rod 4. Fluid passage beyond the piston rod will be described later. It is important to note that these flows are in parallel with the flows into the cavities 32 and 33 which actuate the gripper.

An eyebolt 53 and locknut 54 are threaded into the manifold 35 and used for pulling the entire invention down the pipeline. An end plug 55 is threaded into the mandrel 22 to plug the end of cavity 32.

Because of the many hydraulic passages and cavities, there are many seals used in the gripper 6. There are many different ways to seal the components and many kinds of seals, but in the preferred embodiment, the following seals are used. An 0-ring seal and modular backup 56 is used in the mandrel 22 to seal the cavity 32. Also sealing cavity 32 is poly seal and backup 57. A seal 58 is used to scrape the mandrel bore 59 to keep dirt which enters slot 30 from contacting seal 57. The other side of piston 29 uses identical seals 58 and 57 in similar roles. A seal 44 mentioned previously is used to seal the two ends of spring-loaded check valves 42 and check valve 43.

An O-ring 60 seals the cavity 33 from groove 46. An 0-ring seal 61 and two modular back-ups seal groove 46 from groove 49. O-ring seal and two modular back-ups 62 seals feed hole 48 from groove 50. 0-ring seal 63 seals grooves 49 and 50 from the external environment. 0-ring seals 64 in a static face seal configuration seal ports in the manifold from the external environment.

Figure 4:
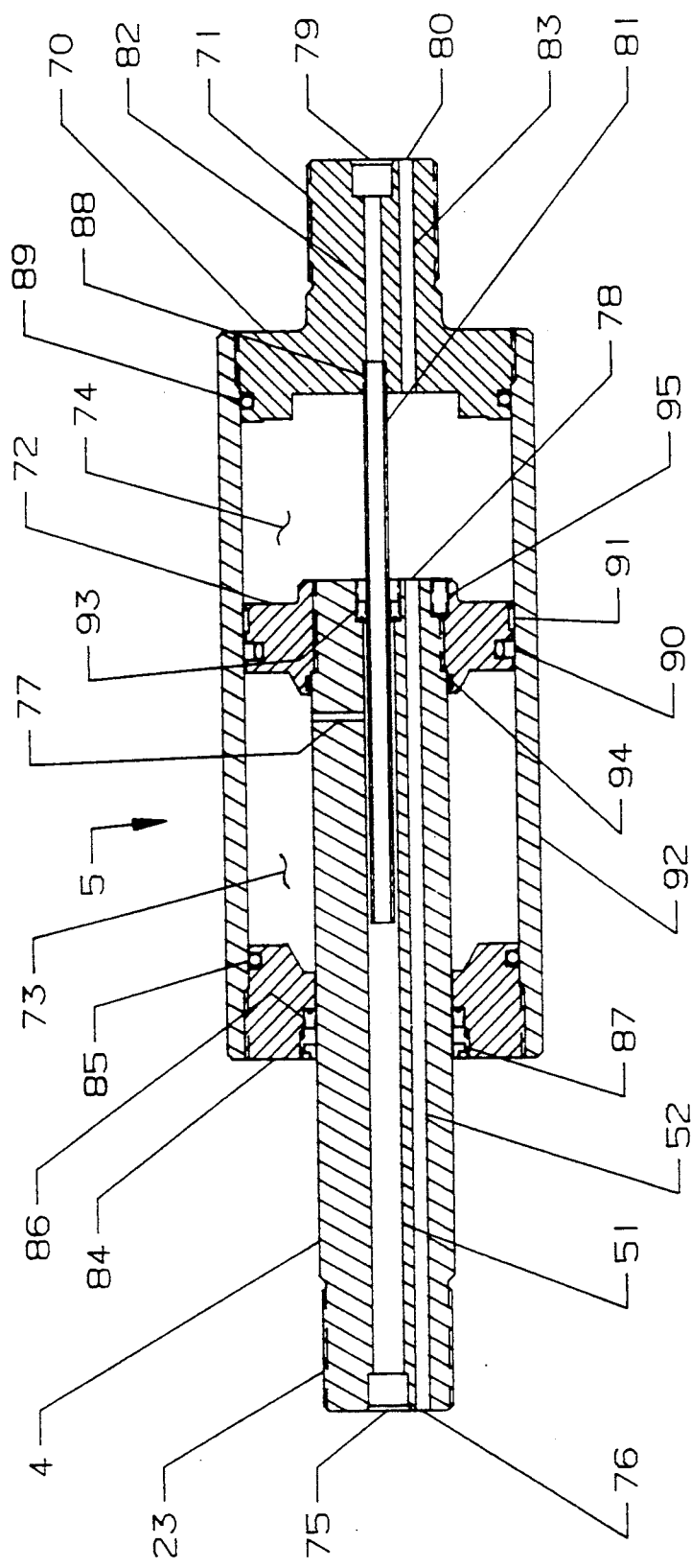
FIG. 4 is a cross sectional view of the main cylinder of the present invention.

Now please refer to FIG. 4, which shows a cross section of the main cylinder, item 5 in FIG. 1. The main cylinder is the device which generates motion of the two pipe grippers (items 6 and 7 in FIG. 1). The outboard gripper (item 6 in FIG. 1) is attached to the piston rod 4 with threads 23. The inboard gripper (item 7 in FIG. 1) is attached to the end cap 70 with threads 71. Attached to piston rod 4 is the piston 72.

Motion of the piston 72 is generated by fluid flow into and out of rod end cavity 73 and cap end cavity 74. Fluid flows into and out of cavity 73 through feed holes 77, 51 and port 75. Port 75 is connected into the outboard gripper (6 in FIG. 1). Fluid flows into and out of cavity 74 through port 76, feed hole 52 and port 76. Port 76 is connected into the outboard gripper (6 in FIG. 1).

Fluid to control the inboard gripper (7 in FIG. 1) gets there by flowing through the main cylinder 5. Fluid which enters port 75 can also exit port 79 via feed hole 51, tube 81, and feed hole 82 and flow into the inboard gripper. Fluid which enters port 76 can also exit port 80 via feed hole 52, cavity 74 and feed hole feed hole 83 and flow into the inboard gripper. It is important to note that fluid flow into the inboard gripper is done in parallel with flow into the main cylinder 5. Thus the grippers (6,7 in FIG. 1) can be actuated without moving the main cylinder 5 and vice versa.

The rod end cap 84 contains and 0-ring seal 85 and polypak seal 86 to seal cavity 73 from the external environment. It also contains a rod wiper 87 to clean the rod 4 as it enters the cap 84. The end cap 70 contains an 0-ring seal 89 to seal cavity 74 from the environment and threads 88 for attaching feed tube 81.

The piston contains a seal 90 and 0-ring seal 94 to seal cavity 73 from cavity 74 and a wear ring 91 to minimize wear of the inside surface of cylinder tube 92. Seal 93 seals cavity 74 from feed hole 51. A setscrew 95 is used to prevent unscrewing of piston rod 4 from piston 72.

Figure 5:
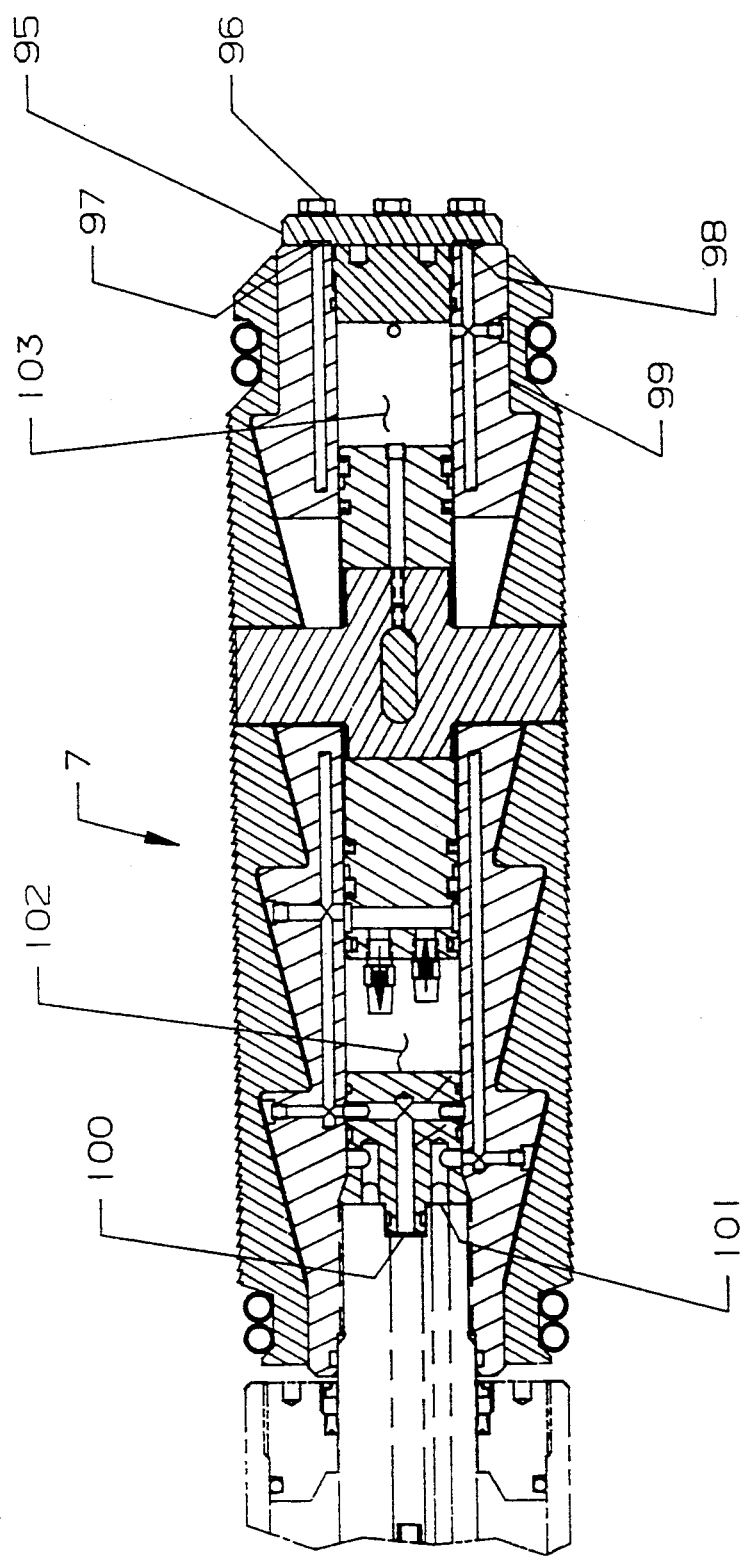
FIG. 5 is a cross sectional view of the inboard gripper of the main cylinder.

FIG. 5 shows a cross sectional view of the inboard gripper, item 7 in FIG. 1. The inboard gripper is almost identical to the outboard gripper shown in FIG. 3. Because of this, a detailed description will not be given. The text below will concentrate on the differences between this gripper and the outboard gripper. The only mechanical difference is that an end cap 95 of the inboard gripper replaces the manifold 35 of the outboard gripper. The end cap 95 blocks the ports 97,98 and is fastened to the mandrel 99 by bolts 96.

Functionally, the differences are also very small. The only difference is the porting and the direction of fluid flow. Fluid enters and exits the inboard gripper 7 through ports 100 and 101 from the main cylinder. From these ports fluid is directed to the piston actuation cavities 102, 103 in the reverse direction that it occurs in the outboard gripper. All other functions of the two grippers are identical.

Figure 6:
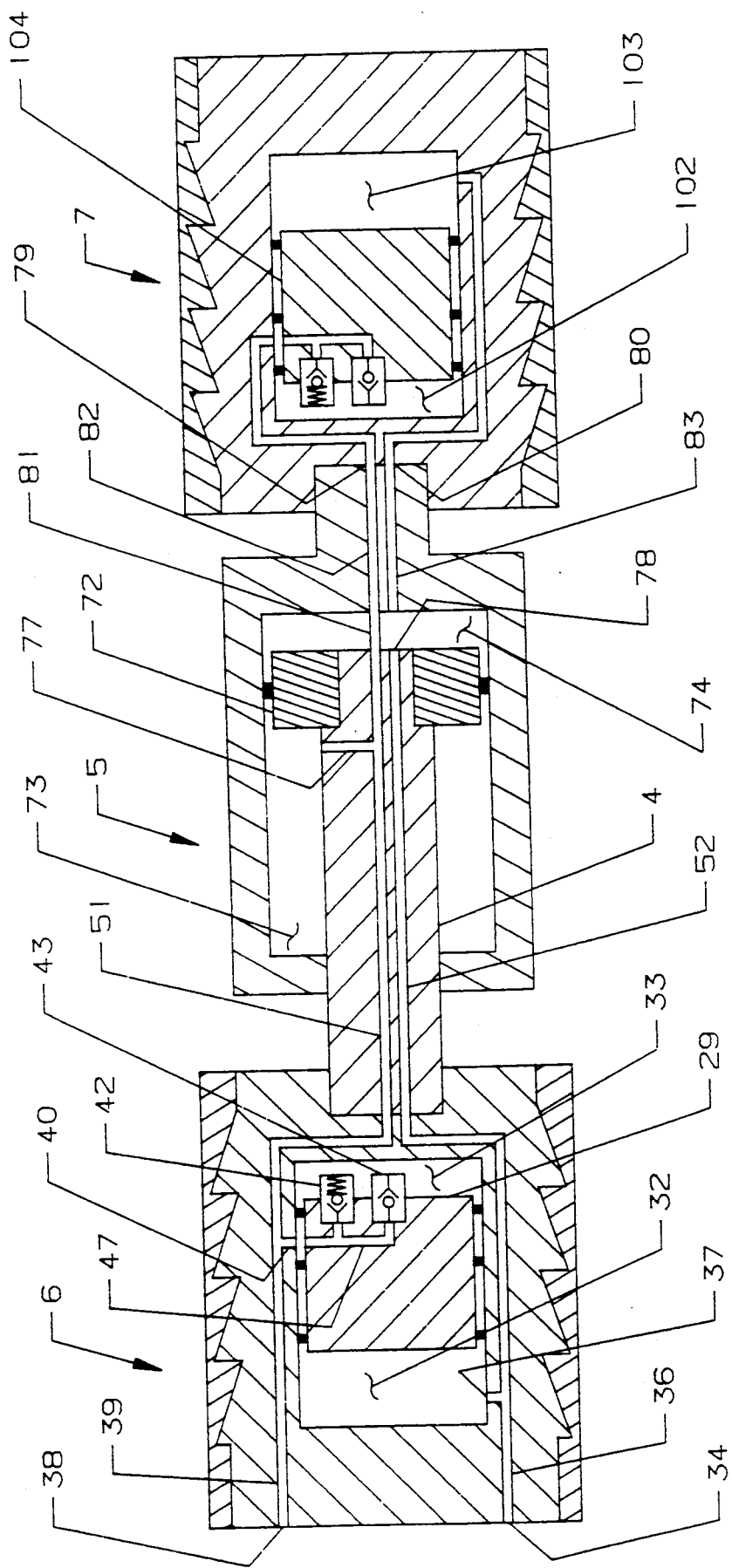
FIG. 6 is a schematic drawing showing the hydraulic porting of the various parts of the invention.

Referring now to FIG. 6, the complete hydraulic porting of the invention is shown. The hydraulic cavities 32 and 103 which release the grippers 6 and 7 and the cavity 74 which extends the main cylinder 5 are all connected to port 34. Thus pressurizing port 34 will usually extend the main cylinder 5 and release the grippers 6,7. Special cases where this does not occur will be described later The hydraulic cavities 33 and 102 which engage the grippers 6,7 and the cavity 73 which retracts the main cylinder 5 are all connected to port 38. Thus pressurizing port 38 will usually retract the main cylinder 5 and engage the grippers 6,7. Special cases where this does not occur will be described later. The grippers 6,7 and the main cylinder 5 are connected in parallel, so that it is possible to move the main cylinder 5 without moving the gripper actuation pistons 29, 104, and vice versa.

The hydraulic operation of the invention proceeds as follows. First, the main cylinder is extended and the grippers are released by pressurizing port 34 and connecting port 38 to the reservoir tank (not shown) so that fluid may exit at low pressure.

Next, the grippers 6,7 are engaged without moving the main cylinder 5. In the preferred embodiment this is done by maintaining 9000 psi at port 38 and 6800 psi at port 34. Since the gripper actuation pistons 29, 104 have equal areas on both sides, the pressure difference will cause them to move and engage the grippers 6,7. The piston 72 of the main cylinder 5, however, does not have equal areas exposed to the pressure in cavities 73 and 74. Because of the rod 4, the area exposed to pressure in cavity 73 is only 0.75 times the area exposed to cavity 74 (in the preferred embodiment). Thus if cavity 73 has 9000 psi pressure in it, the piston 72 will remain in the extended position as long as the pressure in cavity 74 is greater than (0.75×9000) or 6750 psi. Since the pressure in cavity 74 is 6800 psi, the main cylinder 5 will remain in the extended position.

The next operation requires the main cylinder 5 to retract while the grippers 6,7 remain engaged. This is done by pressurizing port 38 and connecting port 34 to the hydraulic reservoir tank.

The next operation is to release the grippers 6,7 and extend the main cylinder 5. This is done by pressurizing port 34 and connecting port 38 to the reservoir tank (not shown).

The next operation is to retract the main cylinder 5 without engaging the grippers 6,7. This is accomplished using the spring loaded check valve 42 and regular check valve 43 in outboard gripper 6. The inboard gripper 7 has identical components. Therefore the following description of the outboard gripper's 6 operation will also apply to the inboard gripper 7. In the preferred embodiment the spring loaded check valve is set at approximately 400 psi. Therefore hydraulic fluid will not be able to enter cavity 33 and engage the gripper 6 unless the pressure in port 38 is greater than 400 psi. Under normal noload conditions, the main cylinder 5 will be able to retract at a pressure of approximately 100-200 psi. Therefore if the pressure at port 38 is controlled to be less than or equal to 300 psi the main cylinder 5 will retract, but the grippers 6,7 will not actuate.

After the main cylinder is fully retracted it is slid down the pipeline and placed in position to make the next joint. The process described above is then repeated.

The hydraulic power supply for this invention can be a gasoline or diesel-driven hydraulic pump and a valve package to regulate the pressures as specified above. The power system is designed to supply up to 7 gallons per minute at a pressure less than 4000 psi, and up to 3.5 gallons per minute at pressures between 4000 and 9000 psi. The power supply, valve package, and the press all fit on top of a flat bed trailer approximately 4 feet wide and 8 feet long.

While a specific embodiment of the invention is described hereinabove, it is understood that variations of the apparatus and method herein described may be made within the scope and terms of the following claims.

We claim:

1. A pipe coupling apparatus for press fitting the ends of first and second sections of pipe together wherein the end of said first pipe section has an internal diameter slightly less than the external diameter of the end of said second pipe section, said apparatus comprising:
   two grippers each of which fits in the end sections of said first and second pipes to be joined and frictionally engages the interior walls of said pipes; and
   means for drawing said grippers toward one another until the exterior surface of said second pipe section frictionally engages the interior surface of said first pipe section, thereby effecting a press fit joint between said pipes.

2. A pipe coupling apparatus for press fitting the ends of first and second pipe sections into a coupling disposed between said ends and containing apertures for receiving said ends, said apparatus comprising:
   two grippers each of which fits in the ends of said first and second sections of pipe to be joined and frictionally engages the interior walls of said pipes; and
   means for drawing said grippers toward one another until the exterior surfaces of said first and second pipe sections engage the interior surfaces of said apertures, thereby effecting press fit joints between said first pipe section and said coupling and between said second pipe section and said coupling.

3. A pipe coupling apparatus according to either of claims 1 or 2 wherein said means for drawing said grippers toward one another further comprises:
   a hydraulic actuator connected to said grippers;
   a hydraulic power source; and
   fluid communication means connecting said actuator and said source;
whereby hydraulic power is transferred from said source to said actuator to move said grippers toward one another.

4. A pipe coupling apparatus according to claim 3 wherein said hydraulic actuator comprises a hydraulic ram having a cylinder connected to one gripper and a piston with piston rod connected to said other gripper.

5. A pipe coupling apparatus according to either of claims 1 or 2 wherein said grippers further comprise:
   a mandrel which can be inserted in the end of said pipe;
   a plurality of slip pads arranged concentrically around the axis of said mandrel; and
   a means for extending said slip pads radially outward from said mandrel until said slip pads frictionally engage the interior walls of said pipes.

6. A pipe coupling apparatus according to claim 5 wherein said means for extending said slip pads further comprises:
   exterior surfaces on said mandrel inclined in relation to the axis of said mandrel; and
   an inclined surface on the back of said slip pads which is inclined at a reverse angle to said mandrel exterior surfaces and is in contact with said mandrel exterior surface;
whereby relative axial motion between said mandrel and said slip pads along the axis of said pipe causes said slip pads to extend radially away from said axis until said slip pads frictionally engage the interior wall of said pipe or to retract radially away from the interior wall of said pipe allowing said apparatus to be moved and positioned within said pipe.

7. A pipe coupling apparatus according to claim 6 wherein said mandrel contains a plurality of low friction devices mounted on the exterior of said mandrel at a position radially further distant from the axis of said mandrel than said slip pads when said slip pads are in the retracted position whereby said apparatus can be moved axially within said pipe using minimal force.

8. A pipe coupling apparatus for press fitting the ends of a plurality of pipe sections into a hollow coupling having a plurality of ends, each end containing an aperture for receiving one of said pipe section ends, said apparatus comprising:
- a hollow, pipe coupling adaptor having an elongated section shaped to fit within one of said apertures and a raised shoulder on the exterior thereof for abutting an end of said coupling;
- at least two grippers one of which fits in the end section of one of said pipe sections and one of which fits within the hollow section of said adapter disposed in said aperture of said coupling, said grippers frictionally engaging the interior walls of said pipe and said adapter; and
- means for drawing said grippers toward one another;
whereby the end of said pipe section is press fit into said coupling.

9. A pipe coupling apparatus according to claim 8 wherein said means for drawing said grippers toward one another further comprises:
- a hydraulic actuator connected to said grippers;
- a hydraulic power source; and
- fluid communication means connecting said actuator and said source;
whereby hydraulic power is transferred from said source to said actuator to move said grippers toward one another.

10. A pipe coupling apparatus according to claim 9 wherein said hydraulic actuator comprises a hydraulic ram having a cylinder connected to one gripper and a piston with piston rod connected to said other gripper.

11. A pipe coupling apparatus according to claim 9 wherein said means for extending said slip pads further comprises:
- exterior surfaces on said mandrel inclined in relation to the axis of said mandrel; and
- an inclined surface on the back of said slip pads which is inclined at a reverse angle to said mandrel exterior surface and is in contact with said mandrel exterior surface;
whereby relative axial motion between said mandrel and said slip pads along the axis of said pipe causes said slip pads to extend radially away from said axis until said slip pads frictionally engage the interior wall of said pipe or said adaptor or to retract radially away from the interior wall of said pipe allowing said apparatus to be moved and positioned within said pipe or said adaptor.

12. A pipe coupling apparatus according to claim 11 wherein said mandrel contains a plurality of low friction devices mounted on the exterior of said mandrel at a position radially further distant from the axis of said mandrel than said slip pads when said slip pads are in the retracted position whereby said apparatus can be moved axially within said pipe or said adaptor using minimal force.

13. A pipe coupling apparatus according to claim 8 wherein said grippers further comprise:
- a mandrel which can be inserted in the end of said pipe or said adaptor;
- a plurality of slip pads arranged concentrically around the axis of said mandrel; and
- a means for extending said slip pads radially outward from said mandrel until said slip pads frictionally engage the interior walls of said pipes.

* * * * *